United States Patent [19]

Kim

[11] 4,271,054

[45] Jun. 2, 1981

[54] PREPARATION OF FURAN POLYMERS

[75] Inventor: Young D. Kim, Columbus, Ohio

[73] Assignee: Ashland Oil, Inc., Ashland, Ky.

[21] Appl. No.: 131,563

[22] Filed: Mar. 19, 1980

[51] Int. Cl.$^3$ .............................................. C08L 61/06
[52] U.S. Cl. ............................ 260/29.3; 260/29.2 N;
260/29.4 R; 528/129; 528/249; 528/259;
528/266
[58] Field of Search ............ 260/29.3, 29.2 N, 29.4 R;
528/129, 249, 259, 266

[56] References Cited

U.S. PATENT DOCUMENTS

| | | | |
|---|---|---|---|
| 3,312,650 | 4/1967 | Case et al. ............................ | 260/29.3 |
| 3,716,512 | 2/1973 | Vargiu et al. ............... | 260/29.4 R X |
| 3,852,232 | 12/1974 | Bowman et al. ...................... | 260/29.3 |
| 3,854,988 | 12/1974 | Ashall et al. ............... | 260/29.4 R X |
| 3,925,286 | 12/1975 | Fahey .................... | 260/29.3 |
| 4,028,271 | 6/1977 | Schaidle et al. ................ | 260/29.3 X |
| 4,055,528 | 10/1977 | Kim ..................... | 260/29.3 |

*Primary Examiner*—Lucille M. Phynes
*Attorney, Agent, or Firm*—Pollock, Vande Sande & Priddy

[57] ABSTRACT

A process for preparing a water-compatible furan polymer which includes subjecting a composition containing at least one saturated aliphatic monohydric alcohol; water; furfuryl alcohol; aldehyde; phenolic compound; and nitrogen-containing compound to condensation reaction at basic pH, and then subjecting the composition to a condensation reaction at an acidic pH; and the product obtained thereby.

34 Claims, No Drawings

PREPARATION OF FURAN POLYMERS

DESCRIPTION

1. Technical Field

The present invention is concerned with a process for preparing water-compatible nitrogen-containing furan polymers and with the polymers obtained thereby. The furan polymers prepared according to the present invention are stable and clear even in combination with relatively large amounts of water. The furan polymers prepared according to the present invention are especially useful as binders for molding compositions, such as refractories, abrasive articles, and molding shapes, such as cores and molds.

2. Background Art

Furan polymers have been used in the foundry industry as binders. Such polymers have been prepared from furfuryl alcohol with varying amounts of an aldehyde, such as formaldehyde, nitrogen-containing compound, such as urea and/or precondensates of an aldehyde and a nitrogen-containing compound, and a phenolic compound. The furfuryl alcohol condenses in the presence of an acid catalyst under acidic conditions. It is also known that aldehydes are condensed in alkali media in the presence of a basic catalyst. In fact, prior to the present invention, the practice of carrying out reaction first under basic conditions and then under acidic conditions in order to effect both the condensation of the furfuryl alcohol and aldehyde has been practiced. Also, processes have been suggested wherein condensation in an acid medium is followed by condensation in a basic medium, as is exemplified by U.S. Pat. No. 3,312,650 to Case et al.

Although many processes have been suggested for producing furfuryl alcohol polymers, a need remains to provide a nitrogen-containing furfuryl alcohol polymer which is compatible with water and is stable even when in the presence of relatively large amounts of water, such as up to about 30% by weight. Moreover, it is desirable to be able to provide such polymers without adversely affecting to an undesired degree the bonding properties of the furan polymer.

DISCLOSURE OF INVENTION

The present invention is concerned with a process for preparing water-compatible furan polymers. The process includes providing a composition which contains at least one saturated aliphatic monohydric alcohol having one to three carbon atoms, water, furfuryl alcohol, aldehyde, phenolic compound, and a nitrogen-containing compound containing at least one

$H_2NC$ group.

The composition is subjected to a condensation reaction at a basic pH in the presence of a basic catalyst. The condensation reaction is carried out until the free aldehyde content of the composition is about 10 to about 16% by weight. The composition is then subjected to a condensation reaction at an acidic pH. The condensation reaction under the acidic conditions in continued until the composition has a viscosity of about 0.5 to about 5 stokes.

In addition, the present invention is concerned with water-compatible furan polymers obtained by the above process.

DESCRIPTION OF BEST AND VARIOUS MODES FOR CARRYING OUT INVENTION

The process of the present invention is concerned with producing a water-compatible furan polymer composition whereby the furan polymer is stable even in the presence of relatively large amounts of water (e.g. up to about 30% by weight of water) and forms clear solutions therein.

It is essential for achieving the objectives of the present invention that the condensation reactions be carried out in the presence of at least one alcohol. The alcohols employed are preferably saturated, aliphatic, monohydric alcohols containing 1 to 3 carbon atoms. Examples of suitable alcohols include methanol, ethanol, n-propanol, and isopropanol. Mixtures of these alcohols can be used when desired. The preferred alcohol is methanol. The alcohol is generally present in the reaction composition in amounts of about 1 to about 20% by weight, preferably about 1 to about 10% by weight, and most preferably about 2 to about 5% by weight.

In addition, the reaction is conducted in the presence of water. The water is generally present in amounts of about 5 to about 20% by weight, and preferably about 8 to 10% by weight based on the reaction composition.

Furfuryl alcohol is one of the required reactants and is usually present in amounts of about 20 to about 50% by weight, and preferably about 25 to about 50% by weight of the reaction composition.

The reaction composition employed in the present invention also contains an aldehyde such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde. Mixtures of aldehydes can be employed when desired. When formaldehyde is employed, such can be incorporated in any of its various forms, such as formalin, trioxane, and paraformaldehyde. In addition, all or a portion of the aldehyde can be added as a preconcentrate or precondensate, such as with the nitrogen-containing compound. The aldehyde is generally employed in amounts of about 15 to about 40% by weight, and preferably about 20 to about 30% by weight.

The reaction composition also contains a phenolic compound including phenol per se, and substituted phenolic compounds. The phenols which can be employed are generally all phenols which are suitable for forming phenolic resins and which are not substituted at either the two ortho positions or at one ortho and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere with the polymerization at the ortho and-/or para-positions. Substituted phenols employed in the formation of resins include alkyl-substituted phenols, aryl-substituted phenols, cycloaklyl-substituted phenols, alkenyl-substituted phenols, alkoxy-substituted phenols, aryloxy-substituted phenols, halogen-substituted phenols, and hydroxy-substituted phenols, the foregoing substituents containing from 1 to 26, and preferably 1 to 9 carbon atoms. Some examples of suitable phenols include phenol; resorcinol, 2,6-xylenol; o-cresol; n-cresol; p-cresol; 3,5-xylenol; 3,4-xylenol; 2,3,4-trimethylphenol; 3-ethylphenol; 3,5-diethylphenol; p-butylphenol; 3,5-dibutylphenol; p-amylphenol; p-cyclohexylphenol; p-octylphenol; 3,5-dicyclohexylphenol; p-phenylphenol; p-crotylphenol; 3,5-dimethoxyphenol; 3,4,5,-trimethoxyphenol; p-ethoxyphenol; p-butoxyphenol; 3-methyl-4-methoxyphenol; and p-phenoxyphenol. Such phenols can be described by the general formula:

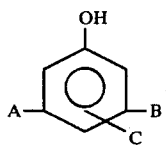

wherein A, B and C are hydrogen, hydrocarbon radicals, oxyhydrocarbon radicals, halogen, or hydroxy. Mixtures of phenolic compounds can be employed when desired.

The preferred phenol compound employed is phenol per se. The phenolic compound is generally present in amounts of about 10 to about 30% by weight, preferably about 10 to about 20% by weight, and most preferably about 15 to about 20% by weight based upon the weight of the reaction composition.

The reaction composition also includes a nitrogen-containing compund. The nitrogen-containing compound must include at least one

H₂NC group.

Examples of some suitable nitrogen-containing compounds are urea, thiourea, melamine, dicyandiamide, benzoguanamine, with the preferred nitrogen-containing compound being urea. Mixtures of nitrogen-containing compounds can be employed when desired. All or a portion of the nitrogen-containing compound can be added as a preconcentrate or condensate with the aldehyde. In a preferred aspect of the present invention a portion of the nitrogen-containing compound is incorporated as a condensate with formaldehyde and is present during the condensation under basic conditions; and the other remaining portion is added as the compound per se to the acidic condensation reaction. The nitrogen-containing compound is present in amounts of about 4 to about 35% by weight based upon the weight of the reaction composition, and preferably about 15 to about 25% by weight.

A preferred aldehyde-nitrogen containing compound precondensate employed is a urea-formaldehyde precondensate which contains about 60% by weight of formaldehyde, about 25% by weight of urea, and about 15% by weight of water. In addition, such is preferably employed in amounts of about 20 to 50% by weight, and most preferably about 30% by weight of the reaction mixture. Furthermore, it is preferred when such a precondensate is employed to also incorporate about 2 to about 10% by weight of aldehyde, and most preferably formaldehyde either in the form of a 50% aqueous solution or as paraformaldehyde. The most preferred amount employed is about 8% by weight of a 50% solids aqueous solution of the formaldehyde. Moreover, when the precondensate is employed, it is most preferred to add for the acidic condensation step up to about 20% by weight of the nitrogen-containing compound, and preferably about 5 to about 10% by weight of the nitrogen-containing compound.

The first stage of the reaction is carried out under basic pH conditions and in the presence of a basic catalyst. Generally the pH of this stage of the reaction is about 8 to about 10, and preferably about 8.5 to about 9.5. Any basic catalyst can be employed in this stage of the reaction. Examples of such basic catalysts include both inorganic and organic materials, such as metal hydroxides, metal carbonates, and amines. Examples of some catalysts include aluminum hydroxide, alkali metal hydroxides, such as sodium hydroxide, potassium hydroxide, alkaline-earth metal hydroxides, such as barium hydroxide, magnesium hydroxide, and cesium hydroxide; and amines, such as the alkanolamines, including triethanolamine. Mixtures of basic catalysts can be employed when desired.

The preferred catalyst employed is sodium hydroxide. The catalyst is generally employed in amounts of about 0.1 to about 5% by weight based upon the weight of the reaction composition, and preferably about 0.1 to about 1% by weight.

This stage of the reaction is carried out until the free aldehyde content of the reaction composition is about 10 to about 16% by weight, and preferably about 10 to 14% by weight. The reaction is generally conducted at temperatures from about 70° to about 100° C. The length of time necessary to carry out this stage of the reaction depends upon the temperature employed, and the relative amounts of the various reactants, but is usually about one-half to about 3 hours, and preferably about 1 to about 1½ hours.

After the free aldehyde content of about 10 to about 16% by weight has been obtained, the pH of the reaction composition is adjusted to about 4 to about 5.5, and preferably 4.5 to about 5.5. This is accomplished by adding an acidic catalyst in sufficient amount to lower the pH to the desired value. Inorganic acids, organic acids, and organic acid anhydrides can be employed. Examples of some suitable acid catalysts include phosphoric acid, hydrochloric acid, sulfuric acid, formic acid, oxalic acid, maleic acid, maleic anhydride, phthalic acid, phthalic anhydride, toluene sulphonic acid, benzene sulphonic acid, xylene sulphonic acid, propionic acid, and any mono- or dicarboxylic aliphatic acid having a constant of ionization sufficient to provide the desired pH. The preferred acid is formic acid. Mixtures of acidic catalysts can be employed when desired.

The acid is generally employed in amounts of about 0.3 to about 5% by weight, and preferably 0.5 to 1.5% by weight.

This stage of the reaction is usually carried out at temperatures of about 90° to about 105° C. The reaction usually takes about ½ to about 5 hours, and preferably 1 to about 3 hours. The reaction at this stage is continued until the viscosity of the composition is about 0.5 to about 5 stokes, and preferably about 1 to about 1.5 stokes. In the preferred method of carrying out the present invention, a portion, and preferably about 5 to 10% by weight based upon the reaction composition, of the nitrogen-containing compound is incorporated at this stage of the reaction. Such can be added after the acid condensation reaction has been conducted for a portion of the time for the entire acid condensing step, such as about 1 hour at reflux (about 90° to about 105° C.). At that point the additional amount of nitrogen-containing compound can be added, and, if needed, additional acid catalyst is added to adjust the pH. Thereafter, the temperature can again be raised to reflux and the reaction continued until the desired viscosity end point is achieved.

After the reaction is completed at this stage, the free aldehyde content is usually about 3 to about 5% by weight.

The furan polymers obtained from the present invention can be employed in room temperature cured no-bake furan binder systems especially for foundry applications. In such instances, usually the furan polymer is admixed with up to about 90% by weight of additional furfuryl alcohol. The furan polymers can be cured employing acid catalysts, such as the inorganic acids including phosphoric acid, and organic acids, such as the organic sulphonic acids, including toluene sulphonic acid, benzene sulphonic acid, xylene sulphonic acid, and cumene sulphonic acid.

In molding compositions the furan polymer is admixed with an aggregate. The aggregate constitutes the major constituent, and the binder constitutes normally a relatively minor amount. In ordinary sand-type foundry applications, the amount of binder is generally no greater than about 10% by weight, and frequently within the range of about 0.5 to about 7% by weight based upon the weight of the aggregate. Most often the binder content range is from about 0.6 to about 5% by weight based upon the weight of the aggregate in ordinary sand-type foundry shapes.

Generally, at least about 80%, and most preferably about 90% by weight, of aggregate employed for foundry shapes has an average particle size no smaller than about 150 mesh (Tyler screen mesh). The aggregate for foundry shapes preferably has an average particle size between about 50 and about 150 mesh (Tyler screen mesh). The preferred aggregate employed for ordinary foundry shapes is silica sand, wherein at least about 70% by weight, and preferably at least about 85% by weight of the sand, is silica. Other suitable aggregate materials include zircons, olivine, aluminosilicate sand, chromite sand, and the like.

Of course, the binder compositions can be employed as binders in other molding compositions in the amounts and with aggregates well known to those skilled in the art.

A valuable additive to the binder compositions of the present invention in certain types of sand is a silane having the general formula:

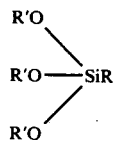

wherein R' is a hydrocarbon radical and preferably an alkyl radical of 1 to 7 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.05 to 2% based on the binder component of the composition, improves the humidity resistance of the system. Mixtures of silanes can be employed when desired.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta (amino-ethyl)-gamma aminopropyltrimethoxy silane); and Union Carbide A-1160 (Ureido-silane).

When the compositions of the present invention are used to prepare ordinary sand-type foundry shapes, the following steps are employed:
1. forming a foundry mix containing an aggregate (e.g. sand) and the contents of the binder system;
2. introducing the foundry mix into a mold or pattern to thereby obtain a green foundry shape;
3. allowing the green foundry shape to remain in the molded pattern for a time at least sufficient for the shape to obtain a minimum stripping strength, i.e. become self-supporting; and
4. thereafter removing the shape from the mold or pattern allowing it to cure at room temperature, thereby obtaining a hard solid cured foundry shape.

In order to further understand the present invention, the following non-limiting examples are provided. All parts are by weight unless the contrary is stated. In all examples the foundry samples are cured by the so-called "no-bake" process.

EXAMPLE I

A composition containing about 60 parts by weight of methanol; about 590 parts by weight or a urea-formaldehyde concentrate, available from Georgia Pacific under the trade designation of Sta-Form 60, containing about 59.77 by weight formaldehyde, about 24.6% by weight urea, and about 15.63 by weight water, a viscosity of about 280 cps at 25° C., pH about 8.1, specific gravity about 1.322, and a mole ratio of formaldehyde to urea of 4.86:1; about 576 parts by weight of furfuryl alcohol; about 340 parts by weight of phenol; about 258 parts by weight of a 50% aqueous solution of formaldehyde; and about 8 parts by weight of a 50% aqueous solution of sodium hydroxide is prepared. The composition has a pH of about 9.7. The composition is charged to a reaction vessel and subjected to heat. The composition is maintained at about 80° C. for about 1½ hours at which time the free formaldehyde content is about 14 and the pH is about 9.

Next, about 36 parts by weight of a 25% aqueous solution of formic acid is added to the reaction mixture to provide a pH of about 4.25. The temperature of the reaction mixture is then raised to reflux about 100° C. and maintained at that temperature for about 70 minutes. Then, about 132 parts by weight of urea are added to the reaction mixture, and the temperature drops to about 75° C. The temperature is then raised to reflux (i.e. about 100° C.) and maintained there for about another 70 minutes until the viscosity is a value of F. The product has a free formaldehyde content of about 3.8, a viscosity of about 1.63 stokes, a refractive index of about 1.4979, a pH of about 7.3, a % nitrogen content of about 5.5, a % phenolformaldehyde of about 7%, and a nonvolatiles content of about 150° C. of about 61.5%. The composition contains about 20.4% by weight of water and is clear. The composition is very stable.

EXAMPLE II

A composition containing about 42.8 parts by weight of methanol; about 250 parts by weight of urea-formaldehyde concentrate containing about 60% by weight formaldehyde, about 25% by weight urea, and about 15% by weight water; about 242.9 parts by weight of furfuryl alcohol; about 80.9 parts by weight of phenol; about 128.3 parts by weight of 50% aqueous solution of formaldhyde, and about 1.5 parts by weight of a 50% by weight aqueous sodium hydroxide solution to provide a pH of about 8.8 is prepared. An additional 3 drops of the 50% aqueous solution hydroxide solution are added to raise the pH to about 9.0. The composition is added to a reaction vessel and heated to about 80° C. and maintained there for about 60 minutes at which time the free formaldehyde content is about 10-14%. About 60 parts by weight of urea and about 13 parts by weight of a 30% aqueous solution of phosphoric acid are added to the reaction mass whereby the pH is about 4.1. The reaction mass is heated to reflux and maintained at reflux for about 2 hours during which time an additional 6 parts by weight of the 30% aqueous phosphoric acid solution is added. Next about 20 parts by weight of urea is added, and the reaction mass is maintained at about 75° C. for an additional 30 minutes. The product obtained has a viscosity of about S, free formaldehyde of about 2.1%, and % of water of about 21.3. The composition is quite stable and clear.

EXAMPLE III

About 100 parts by weight of Wedron 5010 silica sand and about 1.5 parts by weight of a binder obtained from about 70 parts by weight of the furan polymer from Example I and about 30 parts by weight of furfuryl alcohol and about 0.15 parts by weight of gamma aminopropyltriethoxysilane are admixed for about 2 minutes. To this mixture is added about 0.6 parts by weight of an aqueous 80% phosphoric aicd catalyst solution. The mixture is then agitated for about 2 minutes.

The resulting foundry mix is formed into a standard AFS tensile strength sample using the standard procedure. The results for 3 samples each are presented in Table I hereinbelow.

EXAMPLE IV

Example III is repeated except that the furan resin is obtained according to the procedure of Example II. The average results obtained from 3 test samples are presented hereinbelow in Table I.

EXAMPLE V

Example III is repeated with a different batch of material. The average results obtained from 3 test samples are presented hereinbelow in Table I.

EXAMPLE VI

Example IV is repeated with a different batch of material. The average results from 3 test samples are presented hereinbelow in Table I.

| EXAMPLE | III | IV | V | VI |
|---|---|---|---|---|
| Work Time, Min. | 13 | 14 | 14 | 15 |
| Strip Time, Min. | 23 | 22 | 25 | 23 |
| Tensile Strength, psi | | | | |
| 1 hour | 250(84)* | 107 | 213(81) | 133 |
| 3 hours | 507(85) | 237 | 375(82) | 293 |
| 24 hours | 567(89) | 360 | 427(85) | 383 |
| 24 hours + 1 hour 100% relative humidity | 430(91) | 280 | 410(81) | 275 |

*Scratch Resistance

I claim:

1. A process for preparing a water-compatible furan polymer which comprises:
    providing a composition containing at least one saturated aliphatic monohydric alcohol having 1-3 carbon atoms, water, furfuryl alcohol, aldehyde, phenolic compound, and a nitrogen-containing compound containing at least one

$$\overset{\text{O}}{\underset{H_2NC}{\parallel}}$$

subjecting said composition condensation reaction at basic pH in the presence of a basic catalyst until the free aldehyde content of said composition is about 10 to 16%; and
    then subjecting the composition to condensation reaction at an acidic pH for a time sufficient to provide a polymer composition having a viscosity of about 0.5 to about 5 stokes at 25° C., and thereby obtaining said water-compatible furan polymer.

2. The process of claim 1 wherein said alcohol is selected from the group of methanol, ethanol, n-propanol, isopropanol, or mixtures thereof.

3. The process of claim 1 wherein said alcohol is methanol.

4. The process of claim 1 wherein said aldehyde is formaldehyde.

5. The composition of claim 1 wherein said phenolic compound is phenol.

6. The composition of claim 1 wherein said nitrogen-containing compound is selected from the group of urea, thiourea, dicyandiamide, melamine, benzoguanamine, or mixtures thereof.

7. The process of claim 1 wherein said nitrogen-containing compound is urea.

8. The composition of claim 1 wherein at least a portion of said aldehyde and said nitrogen-containing compound is incorporated as a precondensate of said aldehyde and said nitrogen-containing compound.

9. The process of claim 8 wherein said precondensate is a precondensate of urea-formaldehyde.

10. The process of claim 9 wherein said precondensate of urea-formaldehyde contains about 60% by weight of formaldehyde, about 25% by weight of urea, and about 15% by weight of water.

11. The process of claim 1 wherein said alcohol is present in an amount from about 1 to about 20% by weight, said water is present in an amount from about 5 to about 20% by weight, said furfuryl alcohol is present in an amount from about 20 to about 50% by weight, said aldehyde is present in an amount from about 15 to about 40% by weight, said phenolic compound is present in an amount from about 10 to about 30% by weight, and said nitrogen-containing compound is present in an amount from about 4 to about 35% by weight.

12. The process of claim 1 wherein said alcohol is present in an amount from about 1 to about 10% by weight, said water is present in an amount from about 8 to about 10% by weight, said furfuryl alcohol is present in an amount from about 25 to about 50% by weight, said aldehyde is present in an amount from about 20 to about 30% by weight, said phenolic compound is present in an amount from about 10 to about 20% by weight, and said nitrogen-containing compound is present in an amount from about 15 to about 25% by weight.

13. The process of claim 12 wherein said alcohol is present in an amount from about 2 to about 5% by weight, and said phenolic compound is present in an amount from about 15 to about 20% by weight.

14. The process of claim 10 wherein said precondensate of urea-formaldehyde is present in an amount from about 20 to about 50% by weight.

15. The process of claim 10 wherein said precondensate of urea-formaldehyde is present in an amount of about 30% by weight.

16. The process of claim 10 which further includes incorporating about 2 to about 10% by weight of free formaldehyde.

17. The process of claim 1 wherein a portion of said nitrogen-containing compound is present during the condensation under basic pH conditions and additional amounts of said nitrogen-containing compounds are added during the condensation under the acidic pH conditions.

18. The process of claim 17 wherein up to about 20% by weight of said nitrogen-containing compound based upon the weight of the composition is added during the acidic condensation step.

19. The composition of claim 17 wherein about 5 to about 10% by weight of said nitrogen-containing compound based upon the weight of the reaction compositions is added during said acidic condensation reaction.

20. The process of claim 1 wherein the pH of the basic condensation step is about 8 to about 10.

21. The process of claim 1 wherein the pH of the composition during the basic condensation step is about 8.5 to about 9.5.

22. The process of claim 1 wherein said basic catalyst is sodium hydroxide.

23. The process of claim 22 wherein said basic catalyst is present in an amount from about 0.1 to about 5% by weight based upon the weight of the reaction composition.

24. The process of claim 22 wherein said basic catalyst is present in an amount from about 0.1 to about 1% by weight based upon the weight of the reaction composition.

25. The process of claim 1 wherein the condensation under the basic pH conditions is carried out until the free aldehyde content is about 10 to about 14% by weight.

26. The process of claim 1 wherein said acidic pH conditions are about 4 to about 5.5.

27. The process of claim 1 wherein said acidic pH conditions are about 4.5 to about 5.5.

28. The process of claim 1 wherein said acidic catalyst is formic acid.

29. A process for preparing water-compatible furan polymer which comprises providing a composition containing methanol in an amount from about 1 to about 20% by weight, water in an amount from about 5 to about 20% by weight, furfuryl alcohol in an amount from about 20 to about 50% by weight, a precondensate of urea-formaldehyde containing about 60% by weight formaldehyde, 25% by weight urea, and 15% by weight water in an amount of about 20 to about 50% by weight, additional formaldehyde in an amount from about 2 to about 10% by weight, phenol in an amount from about 10 to about 30% by weight; subjecting said composition to a condensation reaction at pH of about 8 to about 10 in the presence of 0.1 to about 5% by weight of sodium hydroxide until the free formaldehyde content of said composition is about 10 to about 16% by weight; then subjecting the composition to a condensation reaction at pH of about 4 to about 5.5 in the presence of formic acid, and adding about 5 to about 10% by weight additional of urea, and conducting said condensation at pH of about 4 to about 5.5 for a time sufficient to provide a polymer composition having a viscosity of about 0.5 to about 5 stokes, and thereby obtaining said water-compatible furan polymer.

30. The process of claim 29 wherein the amount of methanol is about 1 to about 10% by weight; the amount of water is about 8 to about 10% by weight; the amount of furfuryl alcohol is about 25 to about 50% by weight, the total amount of said formaldehyde is about 20 to about 30% by weight, the amount of said phenol is about 10 to about 20% by weight, and the amount of said urea is about 15 to about 25% by weight.

31. The process of claim 30 wherein said methyl alcohol is present in an amount from about 2 to about 5% by weight; said phenol is present in an amount from about 15 to about 20% by weight.

32. The process of claim 1 wherein said nitrogen-containing compound contains at least one

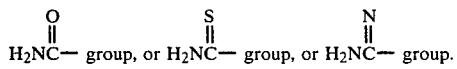

33. The product obtained by the process of claim 1.
34. The product obtained by the process of claim 29.

* * * * *